United States Patent
Hayami et al.

(10) Patent No.: US 6,500,508 B2
(45) Date of Patent: Dec. 31, 2002

(54) FLAME-RETARDANT RESIN COMPOSITION, AND INSULATED WIRE, SHIELDED WIRE AND INSULATING TUBE COMPRISING THE COMPOSITION

(75) Inventors: Hiroshi Hayami, Osaka (JP); Yumi Kawabata, Tochigi (JP); Satoshi Ebina, Tochigi (JP)

(73) Assignee: Sumitomo Electric Fine Polymer, Inc., Osaka (JP)

( * ) Notice: Subject to any disclaimer, the term of this patent is extended or adjusted under 35 U.S.C. 154(b) by 0 days.

(21) Appl. No.: 09/780,458

(22) Filed: Feb. 12, 2001

(65) Prior Publication Data

US 2001/0005731 A1 Jun. 28, 2001

Related U.S. Application Data

(62) Division of application No. 08/990,803, filed on Dec. 15, 1997, now Pat. No. 6,204,318.

(30) Foreign Application Priority Data

Dec. 16, 1996 (JP) ................................. 8-335991

(51) Int. Cl.⁷ ............................ H01B 3/70; H01B 3/44; H01B 7/29; H01B 7/295; B29D 23/00
(52) U.S. Cl. ...................... 428/36.9; 524/432; 524/580; 524/581; 525/331.7; 525/331.8; 525/333.7; 525/333.8; 525/333.9; 526/160; 526/170; 526/348.1; 526/943
(58) Field of Search ..................... 428/36.9; 524/432, 524/580, 581; 525/331.7, 331.8, 333.7, 333.8, 333.9; 526/160, 170, 348.1, 943

(56) References Cited

U.S. PATENT DOCUMENTS

| | | | |
|---|---|---|---|
| 5,272,236 A | * 12/1993 | Lai et al. | 526/348.5 |
| 5,470,657 A | 11/1995 | Hayami | |
| 5,539,052 A | * 7/1996 | Shieh et al. | 525/198 |
| 5,575,965 A | 11/1996 | Caronia et al. | |
| 5,656,371 A | 8/1997 | Kawahigashi et al. | |
| 5,874,513 A | 2/1999 | Watanbe et al. | |

FOREIGN PATENT DOCUMENTS

| | | | |
|---|---|---|---|
| EP | 0416815 | 3/1991 | |
| EP | 416815 A2 | * 3/1991 | C08F/10/00 |
| JP | 6-306121 | 11/1994 | |
| JP | 6-345979 | 12/1994 | |
| WO | 93/08221 | 4/1993 | |

OTHER PUBLICATIONS

"Progress in Polymer Science," vol. 21 (1996), pp. 651–706.

\* cited by examiner

*Primary Examiner*—David W. Wu
*Assistant Examiner*—Kelechi Egwim
(74) *Attorney, Agent, or Firm*—McDermott, Will & Emery

(57) ABSTRACT

A flame-retardant resin composition for insulated wires, shielded wires and insulating tubes which are used in the field requiring high-frequency current transmission, for example, in the field of high-density wiring of internal circuits in electronic appliances. The composition comprises (a) a thermoplastic polyolefinic resin having a density of smaller than 0.89 g/cm³, which is prepared by copolymerizing ethylene and a non-polar α-olefin in the presence of a single-site metallocene catalyst, (b) a halogen-containing flame retardant, and (c) zinc oxide. After crosslinking, the composition is used in forming an insulating coating for insulated wires and shielded wires, and in forming insulating tubes.

2 Claims, 5 Drawing Sheets

FLAME-RETARDANT RESIN COMPOSITION, AND INSULATED WIRE, SHIELDED WIRE AND INSULATING TUBE COMPRISING THE COMPOSITION

This application is a Divisional of application Ser. No.08/990,803 filed Dec. 15, 1997, now U.S. Pat. No. 6,204,318 B1.

FIELD OF THE INVENTION

The present invention relates to novel flame-retardant resin compositions, and to insulated wires, shielded wires and insulating tubes comprising the composition.

BACKGROUND OF THE INVENTION

Being different from light-emitting display devices such as cathode ray tubes and plasma display devices, liquid crystal display devices are generally provided with a light source (back light) at the back of the liquid crystal panel, in which the light emitted by the light source and transmitted through the panel is utilized for producing images on the panel. As the light source for the back light, generally used is a cold-cathode tube (fluorescent lamp) or the like, to which is applied a high-frequency current as generated in a lighting circuit to have a frequency of from tens to hundreds Hz or so and an effective voltage of hundreds volts or so.

The US UL (Underwriters Laboratories Inc.) Standards, which are the worldwide safety standards for insulated wires for internal wiring in electronic appliances, are applied to the insulating coatings for the insulated wires and shielded wires through which the high-frequency current is supplied to the cold-cathode tube, and to the insulating tubes to be applied over the connections between the cold-cathode tube and the insulated wires, for the purpose of ensuring the mechanical properties of those insulating coatings and insulating tubes and of ensuring the safety thereof against accidental fires. The UL Standards state the details of the initial and heat-aged mechanical properties (tensile strength and elongation), flame resistance, and withstand voltage characteristics of various insulated wires and insulating materials.

At present, the insulating materials for that use in insulated wires and others require flexibility for facilitating wiring work, in addition to the characteristics as stated in the UL Standards. In order to meet this requirement, for example, used are crosslinked compositions that are prepared by making soft polyolefinic resins, such as EVA (ethylene-vinylacetate copolymer) and EEA (ethylene-ethyl acrylate copolymer), resistant to flames followed by exposing the resulting flame-retardant resins to accelerated electron beam, and also silicone rubbers, etc. The degree of flexibility of those insulating materials is about 10 kg/cm$^2$ or lower in terms of the modulus of tensile elasticity.

For insulated wires comprising insulating materials of those flame-retardant, crosslinked compositions of soft polyolefinic resins, the UL Standards state that the initial tensile strength of the insulating coatings of the insulated wires must be not smaller than 1500 psi (1.05 kg/mm$^2$) and that the initial elongation thereof must be not smaller than 100%. Regarding the heat-aged physical properties of such insulated wires, the UL Standards state the retention of the initial values, while requiring that the heat-aged tensile strength of insulated wires must be not smaller than 70% of the initial one and that the heat-aged elongation thereof must be not smaller than 65% of the initial one. The heat-aging tests for the physical properties of insulated wires as stated in the UL Standards are, for example, such that samples for a temperature rating of 150° C. are heated in a Geer oven aging tester at 180° C. for 7 days, that samples for a temperature rating of 125° C. are heated in the same at 158° C. for 7 days, and that samples for a temperature rating of 105° C. are heated in the same at 136° C. for 7 days.

As well known, the current demand for compact and lightweight electronic appliances is extremely high. In order to satisfy that demand, it is necessary to provide small-sized internal units.

For example, in electronic appliances comprising liquid crystal display devices, not only the liquid crystal display units but also the peripheral devices of back light units are reduced in size and thinned, and the wiring space for insulated wires for cold-cathode tubes is being narrowed year by year. It is, therefore, important to reduce the diameter of insulated wires.

However, where insulated wires having a reduced diameter are used for high-density wiring in a limited wiring space, the amount of heat generated by the wired circuits increases. In such wired circuits, therefore, the insulating materials to be used require improved heat-aging resistance.

In addition, in such a narrow, limited wiring space, the insulated wires are often kept in contact with the chassis of the back light unit which is at the earth potential. In that case, leakage of high-frequency current from the insulating coatings will increase, often resulting in a great decrease in the supply voltage. As a result, a serious problem will occur that results in lowering the degree of luminance of the cold-cathode tube in the wired device.

For example, the current insulating materials, such as the flame-retardant compositions of soft polyolefinic compositions or silicone rubbers, have a high specific dielectric constant of 3.3 or higher. Therefore, if the insulating coating made of the current insulating material is used for producing insulated wires and if the thickness of the insulating coating is thinned in order to reduce the diameter of the insulated wires, the leak current from the insulated wires increases, often produces the serious problem.

In addition, as a result of the reduction in the wiring space, the insulated wires are often adjacent to the electronic parts in the wired units, in which the noise as derived from the high-frequency current running through the conductor parts will have some negative influences on the electronic circuits, thereby producing another problem of flickering of pictures.

In order to solve this problem, a structure comprising shielded wires may be employed in which the insulating coating formed over the core conductor is further covered with an outer conductor layer such as a metal braided conductor layer or a spirally-covered shielding layer. However, even in those shielded wires, the thickness of the insulating coating must be reduced in order to reduce the diameter of the shielded wires. Therefore, if the conventional insulating material having a high specific dielectric constant is used as the insulating coating in those shielded wires, the capacitance between the core conductor and the outer conductor layer is increased, thereby causing still another problem in that the rising of the wave pattern of the high-frequency current to be transmitted through the shielded wires becomes dull and that the supply voltage is lowered.

On the other hand, silicone rubbers have poor mechanical strength and, if used for producing shielded wires, they are problematic in that the insulating coating of the silicone rubber is cracked after having been rubbed with the metallic material constituting the outer conductor layer, whereby the core conductor and the outer conductor layer are often short-circuited.

For insulating tubes that may be formed over the outer conductor layer in order to insulate and protect the connections between the cold-cathode tube and the insulated wires therearound, generally used are insulating materials similar to those for the insulating coatings for the insulated wires, for example, flame-retardant compositions of soft polyolefinic resins such as those mentioned hereinabove. In those insulating tubes, therefore, it is also an important theme to lower the specific dielectric constant of those insulating materials.

SUMMARY OF THE INVENTION

The object of the invention is to provide a flame-retardant resin composition usable as an insulating material in producing insulated wires, shielded wires and insulating tubes that are especially favorably used in the technical field requiring high-frequency current transmission, for example, in the field of wiring of back lights for liquid crystal display devices, and also to provide insulated wires, shielded wires and insulating tubes comprising the composition.

In order to solve the problems mentioned hereinabove, we, the present inventors have found that a flame-retardant resin composition comprising:

(a) a thermoplastic polyolefinic resin having a density of smaller than 0.89 g/cm$^3$, which is prepared by copolymerizing ethylene and a non-polar α-olefin in the presence of a single-site metallocene catalyst;

(b) a halogen-containing flame retardant; and (c) zinc oxide, is effective. On the basis of this finding, we have completed the invention.

After having been crosslinked, the flame-retardant resin composition of the invention has the mechanical characteristics of an initial tensile strength of not smaller than 1.05 kg/mm$^2$ and an initial elongation of not smaller than 100%, as stipulated in the UL Standards; has the flame resistance that satisfies all the following three requirements in the VW-1 perpendicular combustion test:

1) the longest burn time for the sample is within 60 seconds;

2) the kraft paper attached to the upper side of the sample is not burnt; and 3) the absorbent cotton disposed below the sample is not burnt by the burnt droppings of the sample;

has a modulus of tensile elasticity of not larger than 10 kg/cm$^2$ to be highly elastic; and has good electric characteristics in that its specific dielectric constant is smaller than 3.3. Thus, the flame-retardant resin composition of the invention is good for solving the problems mentioned hereinabove.

As has been mentioned above, the flame-retardant resin composition of the invention has, after having been crosslinked, good mechanical properties, high flame resistance and high flexibility, while having a low relative dielectric constant. Therefore, the resin composition is favorably used, for example, for forming insulating coatings for insulated wires and shielded wires, for forming sheath layers for shielded wires, and for forming insulating tubes having or not having thermal shrinkability.

Preferably, the flame-retardant resin composition of the invention comprises, relative to 100 parts by weight of the thermoplastic polyolefinic resin (a) as produced by copolymerization of ethylene and a non-polar α-olefin in the presence of a single-site metallocene catalyst to have a density of smaller than 0.89 g/cm$^3$, from 20 to 60 parts by weight of the halogen-containing flame retardant (b) and from 5 to 20 parts by weight of the zinc oxide (c), in order to favorably satisfy its characteristic requirements mentioned above.

In the flame-retardant resin composition of the invention, the non-polar α-olefin that constitutes the thermoplastic olefinic resin (a) is preferably at least one selected from the group consisting of 1-butene, 4-methyl-1-pentene, 1-hexene and 1-octene, since the mechanical characteristics of the composition are especially good and since the composition is highly flexible and has a lower specific dielectric constant.

The flame-retardant resin composition, as comprising the combination of the halogen-containing flame retardant (b) and the zinc oxide (c) along with the thermoplastic polyolefinic resin (a), is favorably formed into insulating coatings, sheath layers and insulating tubes such as those mentioned hereinabove, which stand the VW-1 perpendicular combustion test for their flame resistance.

In the flame-retardant composition of the invention, the halogen-containing flame retardant (b) is preferably at least one bromine-containing flame retardant selected from the group consisting of ethylenebis-bromophthalimides, bis(bromophenyl)alkanes, bis(bromophenyl)terephthalamides and polybromobiphenyl ethers. The resin composition comprising such a bromine-containing flame retardant is favorably formed into insulating coatings, sheath layers and insulating tubes such as those mentioned hereinabove, which have good heat-aging resistance as stipulated in the UL Standards. Precisely, after having been heat-aged, the insulating coatings, sheath layers and insulating tubes formed from the resin composition still have a retention of tensile strength of 70% or higher and a retention of elongation of 65% or higher.

The invention further provides insulated wires, which are produced by coating a conductor with the flame-retardant resin composition of the invention followed by crosslinking the composition to form an insulating coating over the conductor.

In the insulated wires of the invention, the insulating coating has a low density and is lightweight and flexible. Therefore, the insulated wires are favorably used for wiring back light units in liquid crystal display devices. In particular, the insulated wires can be well thinned and can be favorably used for high-density wiring even in a limited wiring space.

In addition, in the insulated wires of the invention, the insulating coating has good mechanical properties, good heat-aging resistance and good flame resistance, as stipulated in the UL Standards. Therefore, even when thinned, the insulated wires are still favorably applicable to high-density wiring even in a limited wiring space with high safety.

Moreover, the insulating coating in the insulated wires of the invention has a low specific dielectric constant. Therefore, even when the insulated wires are kept in contact with the chassis of a back light unit which is at the earth potential, little leak of high-frequency current from the insulating coating occurs, without producing the decrease in the degree of luminance of the cold-cathode tube in the wired device.

The invention still further provides shielded wires, which are produced by coating a conductor with the flame-retardant resin composition of the invention, then crosslinking the composition to form a foamed or non-foamed insulating coating over the conductor, and thereafter laminating an outer conductor layer and a sheath layer over the insulating coating in that order.

Like that in the insulated wires, the insulating coating of the shielded wires of the invention has a low density and is lightweight and flexible. Therefore, the shielded wires are favorably used for wiring back light units in liquid crystal display devices. In particular, the shielded wires can be well thinned and can be favorably used for high-density wiring even in a limited wiring space.

In addition, also like that in the insulated wires, the insulating coating of the shielded wires has good mechanical properties, good heat-aging resistance and good flame resistance, as stipulated in the UL Standards. Therefore, even when thinned, the shielded wires are still favorably applicable to high-density wiring even in a limited wiring space with high safety.

Moreover, since the insulating coating of the shielded wires has such good mechanical properties, it is not cracked even when rubbed with the metallic material constituting the outer conductor layer in the process of producing the shielded wires. Therefore, the shielded wires of the invention are surely out of the problem of short-circuiting between the core conductor and the outer conductor layer.

Furthermore, the insulating coating of the shielded wires of the invention has a low specific dielectric constant. Therefore, the shielded wires are free from the trouble of such that the capacitance between the core conductor and the outer conductor layer is increased thereby making the rising of the wave pattern of the high-frequency current to be transmitted through the shielded wires dull and lowering the supply voltage. In addition, owing to the function of the outer conductor layer, the core conductor in the shielded wires is electromagnetically shielded from any externals. Therefore, in electronic units, even when the shielded wires are kept adjacent to the other electronic parts, they are surely free from the trouble of such that the core conductor in the wires has some negative influences on the electronic circuits in the units to make pictures flicker. In particular, where the insulating coating in the shielded wires has a foamed structure, it shall have a lower specific dielectric constant than the insulating coating having a non-foamed structure. Therefore, the shielded wires of the invention in which the insulating coating is a foamed one shall have much more improved characteristics.

Preferably in the shielded wires of the invention, the sheath layer covering the outer conductor layer is formed from the flame-resistant resin composition of the invention by applying the composition onto the outer conductor layer followed by crosslinking it thereon, like the insulating coating.

The shielded wires of that preferred embodiment shall have much more improved flexibility, mechanical-properties, heat-aging resistance and flame resistance.

The invention still further provides insulating tubes, which are produced by shaping the flame-retardant resin composition of the invention into a tube followed by crosslinking it. If desired, the crosslinked insulating tubes may be expanded under heat in the radial direction and thereafter cooled in the expanded condition to thereby make the tubes have thermal shrinkability.

Like that in the insulated wires, the insulating coating in insulating tubes of the invention has a low density and is lightweight and flexible. Therefore, the insulating tubes are favorably used for covering the connections between a cold-cathode tube and insulated wires therearound even in a limited narrow space. In addition, also like that in the insulated wires, the insulating coating in the insulating tubes has good mechanical properties, good heat-aging resistance and good flame resistance as stipulated in the UL Standards. Therefore, when used for covering the connections between a cold-cathode tube and insulated wires therearound, the insulating tubes ensure high safety of the covered connections. Moreover, since the insulating tubes have a low specific dielectric constant, high-frequency current leaks out little through them, and the degree of luminance of the cold-cathode tube is not lowered.

BRIEF DESCRIPTION OF THE DRAWINGS

In FIG. 4 and

FIG. 5, 11 is a chamber, 12 and 20 are insulated wire samples, 13 is a piece of kraft paper, 14 is absorbent cotton, 15 is a burner, 16 is a metal plate, 17 is water, and 18 is an impedance analyzer.

Figure 1:
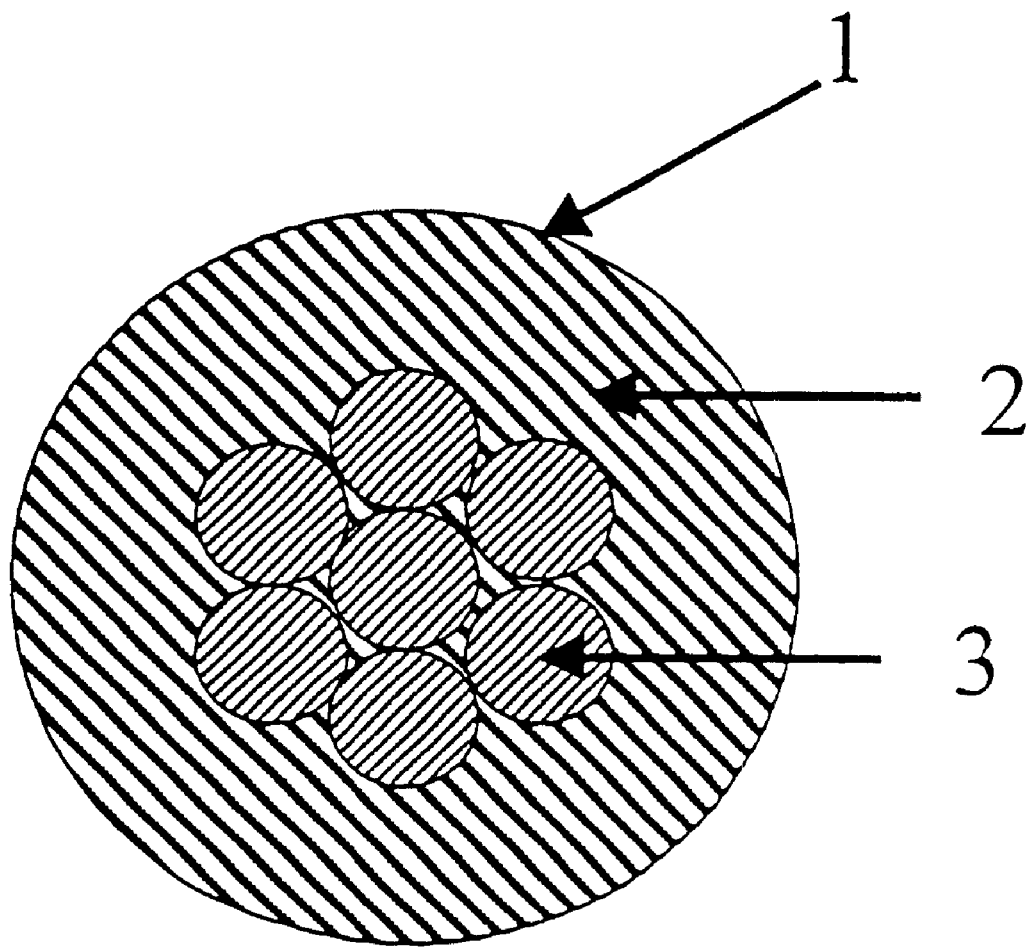
FIG. 1 is a cross sectional view of an insulated wire which comprises an insulating coating and a conductor.

DESCRIPTION OF PREFERRED
EMBODIMENTS OF THE INVENTION

Now, preferred embodiments of the invention are described in detail hereinunder.

As has been mentioned hereinabove, the flame-retardant resin composition of the invention comprises:

(a) a thermoplastic polyolefinic resin having a density of smaller than 0.89 g/cm$^3$, which is prepared by copolymerizing ethylene and a non-polar α-olefin in the presence of a single-site metallocene catalyst;

(b) a halogen-containing flame retardant; and (c) zinc oxide.

After having been crosslinked, the flame-retardant resin composition of the invention has an initial tensile strength of not smaller than 1.05 kg/mm$^2$ and an initial elongation of not smaller than 100%, as stipulated in the UL Standards; has a flame resistance that satisfies all the following three requirements in the VW-1 perpendicular combustion test:

1) the longest burn time for the sample is within 60 seconds;
2) the kraft paper attached to the upper side of the sample is not burnt; and
3) the absorbent cotton disposed below the sample is not burnt by the burnt droppings of the sample;

has a modulus of tensile elasticity of not larger than 10 kg/cm$^2$ to be highly elastic; and has good electric characteristics in that its specific dielectric constant is smaller than 3.3.

If its initial tensile strength is smaller than 1.05 kg/mm$^2$, and if its initial elongation is smaller than 100%, the crosslinked composition would not have good mechanical properties.

If its modulus of tensile elasticity is larger than 10 kg/cm$^2$, the crosslinked composition could not have good elasticity.

If its specific dielectric constant is larger than 3.3, the crosslinked composition could not prevent the leakage of high-frequency current therethrough, resulting in that the insulated wires comprising the composition as the insulating coating are not better than those comprising the conventional, flame-retardant composition of EEA or EVA or the conventional silicone rubber as the insulating coating.

If the crosslinked composition does not satisfy any one of the above-mentioned requirements 1) to 3) in the VW-1 perpendicular combustion test as stipulated in the UL Standards, its flame resistance is poor.

Specifically, the thermoplastic polyolefinic resin (a) that constitutes the flame-retardant resin composition of the invention is produced through continuous copolymerization of ethylene and a non-polar α-olefin, such as 1-butene, 4-methyl-1-pentene, 1-hexene, 1-octene or the like, in a solution polymerization method using a polymerization catalyst system comprising:

(1) a so-called single-site metallocene polymerization catalyst, which is often referred to as a cyclopentadienyl transition metal complex (where the transition metal is an element of Group IV such as titanium, zirconium or hafnium) and in which the cyclopentadienyl group is chemically bonded to the center transition metal via an alkylene group or an atomic group containing a hetero atom (e.g., silicone atom, nitrogen atom) therebetween to give a geometrically-restrained stereostructure of the complex; and (2) a co-catalyst such as typically an aluminoxane compound, e.g., a polymer with a low degree of polymerization of methylaluminoxane.

The polymerization method is disclosed, for example, in Prog. Polym. Sci., 21, 651–706 (1996); U.S. Pat. No. 5,272,236; European Patent Application No. 0416815 A2; and Japanese Patent Application Laid-Open Nos. 6–306121 and 7-500622, the entire disclosures of which are incorporated herein by references.

Being different from any other conventional ethylene-α-olefin copolymers as produced in a polymerization method using a conventional Ziegler catalyst or multi-site metallocene catalyst, the thermoplastic polyolefinic resin (a) has a higher content of the non-polar α-olefin comonomer, owing to the specific function of the single-site metallocene catalyst used for producing it. For example, when ethylene and 1-octene are copolymerized in the polymerization method using the single-site metallocene catalyst, the 1-octene content of the copolymer formed is from about 15 to about 50 mol %, and the density thereof is from about 0.89 g/cm$^3$ to about 0.85. Thus, the copolymer formed shall have a high 1-octene content.

The flexibility of the thermoplastic polyolefinic resin (a) having the specific comonomer composition is comparable to that of soft polyolefinic resins such as EVA and EEA. In addition, as it does not contain any polar comonomer such as vinylacetate and ethylacrylate, the thermoplastic polyolefinic resin (a) has a low specific dielectric constant of from about 2.1 to about 2.2, which is nearly comparable to the specific dielectric constant of conventional polyethylene.

In addition, since the distribution of molecular weight of the thermoplastic polyolefinic resin (a) is narrower than that of the conventional ethylene-α-olefin copolymers, and since the compositional distribution of the comonomer α-olefin in the resin (a) is also narrower than that in the conventional ones, the resin (a) is highly homogeneous and has higher strength than the conventional ones.

Moreover, being different from the conventional ethylene-α-olefin copolymers having a linear, higher-order structure with short-chain branches, the thermoplastic polyolefinic resin (a) has a higher-order structure with long-chain branches in which the length of each long-chain branch extending from the polymer main chain is nearly a length of a polymer chain. Therefore, the resin (a) has good extrudability in shaping it.

Thus, the thermoplastic polyolefinic resin (a) has good mechanical properties, high flexibility and a low specific dielectric constant, while having good extrudability in shaping it.

As examples of the thermoplastic polyolefinic resin (a), mentioned are commercial products of "ENGAGE" series (trade name of DuPont Dow Elastomer Co.), which, however, are not limitative. The commercial products of that series are ethylene/1-octene copolymers of different grades with different octene contents.

Of those commercial products, for example, ENGAGE 8003 (having an octene content of 18 mol% and a density of 0.885) and ENGAGE 8150 (having an octene content of 25 mol% and a density of 0.868) are preferably used in the invention.

The composition of the invention may additionally contain any other conventional resins that are miscible with the thermoplastic polyolefinic resin (a), so far as the additional resins do not interfere with the characteristics of the resin (a). As such additional resins, for example, employable are thermoplastic, soft polyolefinic resins such as EVA and EEA.

In order to make the thermoplastic polyolefinic resin (a) resistant to flames, the halogen-containing flame retardant (b) and the zinc oxide (c), both acting as a flame retardant are added to the resin (a) to form the composition of the invention.

Of the two, the halogen-containing flame retardant (b) is a conventional flame retardants. It is known that a flame retardant of this type produces good flame resistance when added to resin even in such a small amount that does not increase the specific dielectric constant of the resulting resin composition. As the halogen-containing flame retardant (b), herein employable is any of conventional halogen-containing flame retardants. For example, employable are any chlorine-containing flame retardants such as chlorinated paraffins and perchloropentacyclodecane. However, preferably used in the invention is at least one bromine-containing flame retardant selected from the group consisting of ethylenebis-bromophthalimides,bis(bromophenyl)alkanes, bis(bromophenyl)terephthalamides and polybromobiphenyl ethers. The reason is because, as has been mentioned hereinabove, the insulating coating, the sheath layer and the insulating tube which are made from the composition of the invention comprising the bromine-containing flame retardant of that type have good heat-aging resistance. Specifically, the insulating coating, sheath layer and insulating tube still have, after having been heat-aged under the condition as stipulated in the UL Standards, a retention of tensile strength of about 70% or higher and a retention of elongation of about 65% or higher.

The amount of the halogen-containing flame retardant (b) to be in the composition of the invention is not specifically defined, but is preferably from about 20 to about 60 parts by weight, relative to 100 parts by weight of the thermoplastic polyolefinic resin (a) or relative to 100 parts by weight of the sum of the resin (a) and an additional resin optionally combined with the resin (a) . The amount of "100 parts by weight of resin" as referred to hereinunder is meant to include both the amount of the resin (a) only and the total amount of the resin (a) and the additional resin.

If the amount of the halogen-containing flame retardant (b) in the composition is below the defined range, the flame resistance of the composition will be poor. However, if it is above the defined range, the specific dielectric constant of the composition will unfavorably increase, as previously mentioned.

In view of the balance between those two characteristics, i.e., flame resistance and specific dielectric constant of the resin composition, the amount of the halogen-containing flame retardant (b) in the composition is more preferably between about 20 and about 50 parts by weight, even more preferably between about 30 and about 50 parts by weight.

The amount of the zinc oxide (c) to be in the composition is preferably from about 5 to about 20 parts by weight relative to 100 parts by weight of the resin component.

If the amount of the zinc oxide (c) in the composition is below the defined range, the flame resistance of the composition will be poor. However, if it is above the defined range, the specific dielectric constant of the composition will also unfavorably increase.

In view of the balance between those two characteristics, i.e., flame resistance and specific dielectric constant of the resin composition, the amount of the zinc oxide (c) in the composition is more preferably between about 5 and about 15 parts by weight, even more preferably between about 5 and about 10 parts by weight.

In order to further improve the flame resistance of the composition of the invention, any antimony oxide-type flame retardant such as antimony trioxide can be added to the composition along with the halogen-containing flame retardant (b) and the zinc oxide (c).

The amount of the additional antimony oxide-type flame retardant to be in the composition is preferably from about 5 to about 40 parts by weight relative to 100 parts by weight of the resin component. If its amount is below the defined range, the additional antimony oxide-type flame retardant added to the composition could not exhibit its effect. However, if it is above the defined range, the specific dielectric constant of the composition will also unfavorably increase.

In view of the balance between those two characteristics, i.e., flame resistance and specific dielectric constant of the resin composition, the amount of the additional antimony oxide-type flame retardant to be in the composition is more preferably between about 10 and about 40 parts by weight, even more preferably between about 10 and about 30 parts by weight.

Where the amounts of those halogen-containing flame retardant, zinc oxide and additional antimony oxide-type flame retardant in the resin composition of the invention are optimized in the manner as mentioned hereinabove, the resin composition satisfies all the requirements for the mechanical characteristics, the heat-aging resistance and the flame resistance as stipulated in the UL Standards, and its specific dielectric constant is not increased. Surprisingly, we, the present inventors have found that when a suitable amount of zinc oxide is added to a flame-retardant resin composition essentially comprising a halogen-containing flame retardant, the specific dielectric constant of the composition is lowered to be smaller than 3.3. This is a new finding which we have obtained in completing the invention.

The insulated wires of the invention are described in detail hereinunder. FIG. 1 shows one embodiment of an insulated wire 1 which comprises an insulating coating 2 and a conductor 3.

In the insulated wires, the insulating coating is made from the flame-retardant resin composition of the invention, which is crosslinked through exposure to ionizing radiations. This aspect of the invention applies to insulated wires of various structures.

For example, in insulated wires having a basic structure in which the surface of the core conductor of any of various types including single wire conductors, twisted wire conductors and others is coated with one layer of an insulating coating, the insulating coating is formed as a result of coating and crosslinking of the flame-retardant resin composition of the invention.

In other insulated wires in which the core conductor is coated with a plurality of insulating coating layers each having a different thickness, at least one of those insulating coating layers is made from the flame-retardant resin composition of the invention. In still other insulated wires in which a plurality of core conductors are separately coated with one or more insulating coating layers, such as insulated, multi-core cables to be used as twisted pair cables for LAN, the insulating coating for each core cable is made from the flame-retardant resin composition of the invention and/or the sheath layer to bundle up the insulated, multi-core cables is made from the composition. The core conductor may be any of single wire conductors and twisted wire conductors, which may be made of any conventional conductive materials such as copper, soft copper, silver, nickel-plated soft copper and tin-plated soft copper.

The insulated wires of the invention can be produced in any conventional manner. For example, the non-crosslinked, flame-retardant resin composition of the invention is applied directly onto the surface of a core conductor, or onto the insulating layer as previously formed on a core conductor to give a multi-layered insulating coating, or onto the surface of a bundle of a predetermined number of cables to give a sheath layer that covers the multi-core cable, each through continuous extrusion of the composition, and thereafter the thus-applied composition is exposed to ionizing radiations such as accelerated electron beam to thereby crosslink the composition.

In those insulated wires, the thickness of the insulating coating and the diameter of the core conductor are not specifically defined, but may be suitably determined depending on the structure, the standard and other factors of the insulated wires to be produced.

Figure 2:
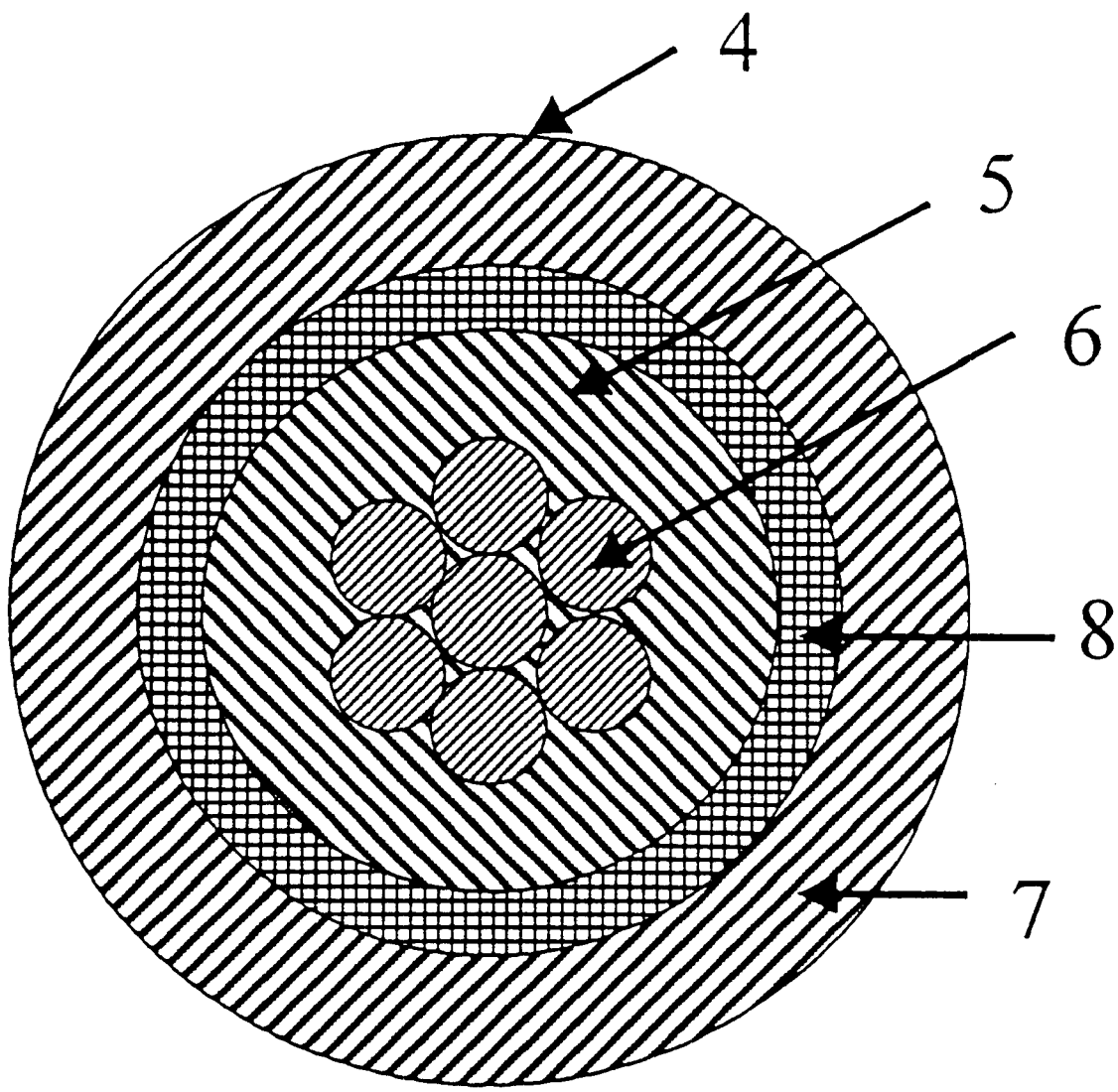
FIG. 2 is a cross sectional view of a shielded wire which comprises a core conductor, an insulating coating, an outer conductor and a sheath.

The shielded wires of the invention are described hereinunder. FIG. 2 shows one embodiment of a shielded wire 4 which comprises a core conductor 6, an insulating coating 5, an outer conductor 8 and a sheath 7.

The shielded wire is composed of a core conductor, an insulating coating as formed on the core conductor by applying the flame-retardant resin composition of the invention onto the core conductor followed by crosslinking it through exposure to ionizing radiations or the like, and an outer conductor layer and a sheath layer as laminated over the insulating coating in that order.

Like that in the insulated wires mentioned hereinabove, the core conductor to be in the shielded wires may be any of single wire conductors and twisted wire conductors of any conventional conductive materials. The outer conductor layer may be any of metal braided conductor layers to be formed by weaving fine wires of conductive materials such as those mentioned hereinabove, or spirally-covered shielding layers to be formed by winding such fine wires of conductive materials over the insulating coating.

The sheath layer may be made of any conventional insulating materials, such as soft polyvinylchloride resin compositions or the like. However, as so mentioned hereinabove, it is preferable that the sheath layer is made of the same material of the insulating coating, or that is, made of the crosslinked, flame-retardant resin composition of the invention.

The shielded wires of the invention which are composed of the plural layers mentioned above can be produced in any conventional manner. For example, the non-crosslinked, flame-retardant resin composition of the invention is applied onto the surface of a core conductor through continuous extrusion, and then crosslinked through exposure to ionizing radiations such as accelerated electron rays to form an insulating coating over the core conductor. Next, the thus-formed insulating coating is covered with an outer conductor layer such as that mentioned above, and further with a sheath layer which is formed through continuous extrusion of a resin composition thereover. If desired, the sheath layer may be crosslinked.

In the shielded wires of the invention, the insulating coating may have a foamed structure as so mentioned hereinabove. In order to form the foamed insulating coating, a foaming agent is added to the non-crosslinked, flame-retardant resin composition, and the composition is foamed while it is extruded onto the core conductor.

In those shielded wires, the thickness of each constituent layer and the diameter of the core conductor are not specifically defined but may be suitably determined depending on the standard and other factors of the shielded wires to be produced.

Figure 3:
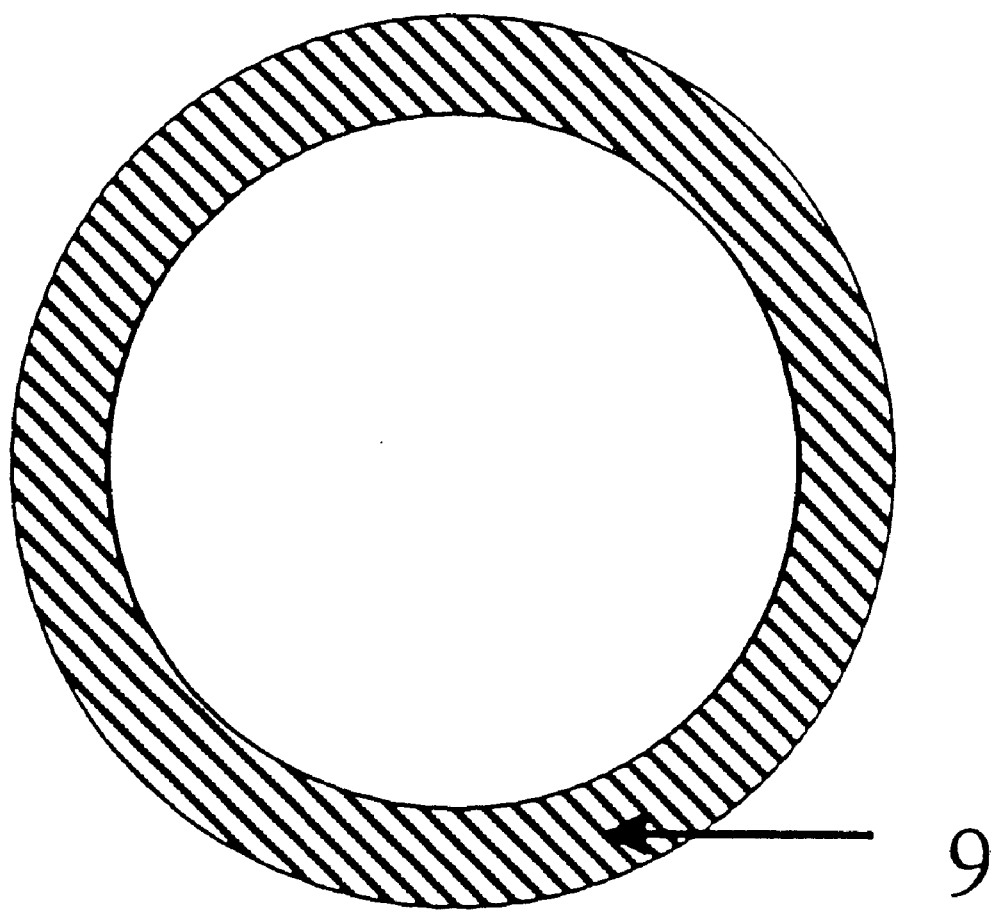
FIG. 3 is a cross sectional view of an insulating tube.

The insulating tubes of the invention are described hereinunder. FIG. 3 shows one embodiment of an insulating tube 9.

The insulating tubes are produced by shaping the flame-retardant resin composition of the invention into a tube through continuous extrusion followed by crosslinking the thus-shaped tube through exposure to ionizing radiations such as accelerated electron beam.

If desired, the crosslinked, insulating tube may be expanded in the radial direction to a predetermined dimension by heating it at a temperature not lower than the melting point of the resin constituting the composition of the tube while introducing compressed gas into the inside of the tube, and thereafter cooled, whereby the insulating tube shall have thermal shrinkability.

Depending on its use, the flame-retardant resin composition of the invention may optionally contain various conventional additives, such as antioxidants, reinforcing agents, fillers, process stabilizers, lubricants, colorants, copper deactivators, light stabilizers, foaming agents, and multifunctional monomers, in addition to the constituent components mentioned above, so far as those additives do not have any negative influences on the mechanical properties, the flexibility, the flame resistance and the specific dielectric constant of the crosslinked composition.

The crosslinking of the resin composition of the invention is not limited to the exposure of the composition to accelerated electron beam, but may be effected in a thermal vulcanization method using organic peroxides, or in a so-called silane-crosslinking method. For the latter silane-crosslinking method, the polyolefinic resin (a) shall have a grafted vinylalkoxysilane moiety. Depending on the crosslinking method to be applied thereto, the resin composition of the invention may contain a suitable amount of any crosslinking agent (e.g., organic peroxides).

The insulated wires of the invention may have any desired structure, as so mentioned hereinabove, in which at least one insulating coating shall be made from the flame-retardant resin composition of the invention. The shielded wires of the invention may also have any desired structure. For example, a plurality of the insulated wires of the invention may be twisted and bundled into a multi-core cable, which may be covered with an outer conductor layer and a sheath layer in that order. Apart from the preferred embodiments of the invention illustrated hereinabove, any other various changes and modifications can be made in the invention without departing from the spirit and scope of the invention.

Now, the invention will be described in further detail with reference to the following examples, which, however, are not intended to restrict the scope of the invention.

First studied were various resins.

Reference Example 1:

100 parts by weight of ethylene-1-octene copolymer (EO-1; this is a commercial product of ENGAGE 8150 having an octene content of 25 mol % and a density of 0.868), which falls within the scope of the thermoplastic polyolefinic resin (a), was mixed with the following components, melted and kneaded to prepare a flame-retardant resin composition.

| Component | Amount (wt. pts.) |
| --- | --- |
| Flame Retardants | |
| Bis(bromophenyl)ethane (*1) | 40 |
| Antimony Trioxide | 20 |
| Lubricant | |
| Stearic Acid | 0.5 |
| Antioxidant (*2) | 2 |
| Reinforcing Agent | |
| Silica (*3) | 10 |

(*1) bromine content, 80% by weight
(*2) pentaerythritol-tetrakis[3-(3,5-di-t-butyl-4-hydroxyphenyl)propionate]
(*3) mean grain size, 2.5 μm; apparent specific gravity, 50 g/liter Reference Example 2:

A flame-retardant resin composition was prepared in the same manner as in Reference Example 1, except that, of the flame retardants, the amount of bis(bromophenyl)ethane was changed to 60 parts by weight and that of antimony trioxide was to 30 parts by weight.

Reference Example 3:

A flame-retardant resin composition was prepared in the same manner as in Reference Example 1, except that 100 parts by weight of EVA (having a vinyl acetate content of 33% by weight), which is one of conventional soft polyolefinic resins, was used as the resin in place of EO-1.

Reference Example 4:

A flame-retardant resin composition was prepared in the same manner as in Reference Example 1, except that 100 parts by weight of a conventional ethylene-α-olefin copolymer [EO-0, Excellene EUL130 (trade name, produced by Sumitomo Chemical Co., having a density of 0.890 and a melt flow rate of 0.8)] was used as the resin in place of EO-1.

The flame-retardant resin compositions of the Reference Examples were subjected to the following tests.

Measurement of Modulus of Tensile Elasticity:

A test piece made from each composition was tested at an elastic stress rate of 50 mm/min, using a tensile tester, to determine its modulus of tensile elasticity (kg/cm$^2$).

Measurement of Oxygen Index:

The oxygen index (O.I.) of each composition was determined in accordance with the method of JIS K7201.

Production of Insulated Wires:

Insulated wires were produced in the following manner. Each composition was pelletized, using a pelletizer, and applied onto a conductor (this was prepared by twisting 19 tin-plated soft copper wires each having a diameter of 0.127 mm, and had an outer diameter of about 0.64 mm) through extrusion at 160° C., using a single-screw extruder (30 mmφ, L/D=24), to form thereon a coating having a thickness of 0.50 mm, which was then exposed to electron beam at an accelerated voltage of 2 MeV to thereby crosslink the coating, the dose of the beam being 200 kGy.

Test for Flame Resistance:

Each sample of those insulated wires was subjected to the VW-1 perpendicular combustion test as stipulated in the UL Standards to evaluate the flame resistance of its insulating coating.

Precisely, as in FIG. 4, the insulated wire sample 12 having a length of 17 inches was perpendicularly set in the chamber 11 of the tester, while a piece of kraft paper 13 was attached to the sample 12 at the position of 13 inches above the bottom of the sample 12, and absorbent cotton 14 was put below the sample 12.

Figure 4:
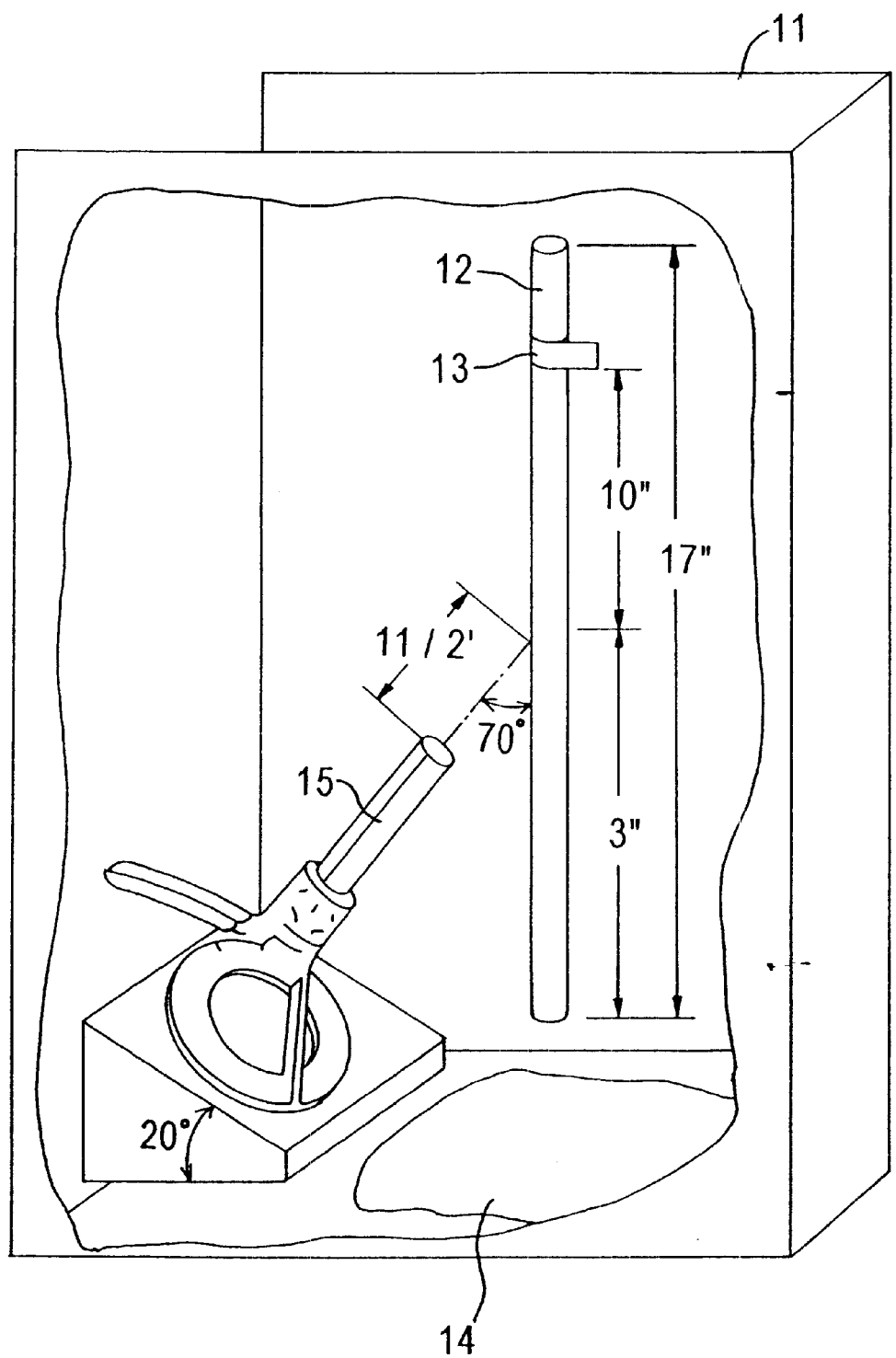
FIG. 4 is a partly-sectioned, perspective view showing the VW-1 combustion tester as stipulated in the UL Standards.

Next, the burner 15 as disposed in front of the sample 12 was ignited, and the flames from the burner 15 were directly applied to the sample 12 for 15 seconds at the position of 3 inches above the bottom of the sample 12 and at an angle of 70°, as indicated by the one-dot chain line in FIG. 4. This flaming operation was repeated 5 times for each sample. In each flaming operation, the burn time taken before the flames of the insulating coating of the sample 12 went out after the flames of the burner 15 had been put out was measured in terms of seconds. The longest burn time was recorded for each sample.

This combustion test was repeated 3 times for each sample. On the basis of the test data obtained, the flame resistance of each sample was evaluated. Precisely, the sample that satisfied all the following three requirements 1) 2) 3) was evaluated good (A), while the sample that did not satisfy any one of those requirements was evaluated bad (B).

1) The longest burn time for the sample was within 60 seconds in every test.

2) The kraft paper 13 was not burnt by the spreading flames from the insulating coating of the sample.

3) The absorbent cotton 14 was not burnt by the burnt droppings from the sample.

Measurement of Specific Dielectric Constant

The specific dielectric constant (ε) of the insulating coating of each insulated wire sample was measured according to the following method.

Figure 5:
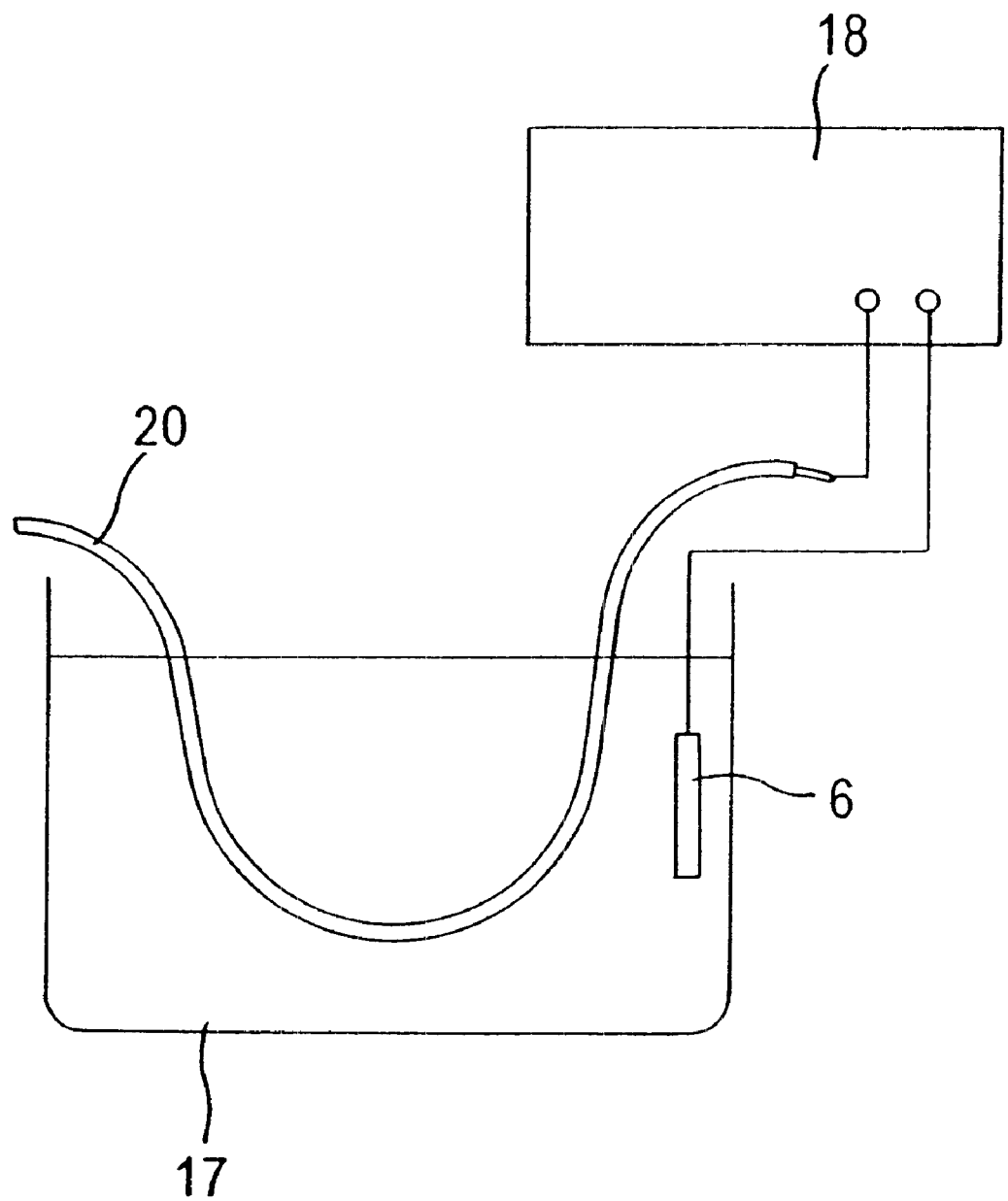
FIG. 5 a graphical view showing the method of measuring the specific dielectric constant of the insulating coating in an insulated wire sample.

As in FIG. 5, the insulated wire sample 20 and the metal plate 16 were dipped in water 17. Using the impedance analyzer 18 (LCR METER, manufactured by Yokogawa Hewlett-Packard Co.), the capacitance of the sample 20 was measured at a frequency of 1 MHz. The value measured was divided by the length L (m) of the sample 20 dipped in water to obtain the capacitance C (pF/m) of the sample 20.

The specific dielectric constant (ε) of the insulating coating of each insulated wire sample was obtained according to the following equation:

$$\epsilon = [C \times \log(d_2/d_1)]/24.12$$

where $d_1$ indicates the outer diameter of the conductor, and $d_2$ indicates the outer diameter of the insulated wire.

Tensile Test:

The conductor was drawn out of each insulated wire sample, and the remaining insulating coating was stretched at an elastic stress rate of 500 mm/min, using a tensile tester, to determine its breaking tensile strength (kg/mm$^2$) and its breaking elongation (%)

The test data obtained are shown in Table 1.

TABLE 1

|  | Reference Example 1 | Reference Example 2 | Reference Example 3 | Reference Example 4 |
|---|---|---|---|---|
| Modulus of Tensile Elasticity, kg/cm2 | 5.0 | 5.2 | 4.8 | 15 |
| Oxygen Index | 25 | 28 | 29 | 25 |
| Specific Dielectric Constant, ε | 2.7 | 2.9 | 3.4 | 2.7 |
| Flame Resistance Test — Longest Burn Time, sec | longer than 60 / longer than 60 / longer than 60 | 54 / longer than 60 / longer than 60 | 6 / 2 / 2 | 38 / longer than 60 / 42 |
| Total Evaluation | B | B | A | B |
| Tensile Strength, kg/mm$^2$ | 1.3 | 1.1 | 1.4 | 0.8 |
| Elongation, % | 540 | 480 | 360 | 530 |

From Table 1 above, it is known that the samples of Reference Examples 1 and 2 comprising the resin EO-1, which is within the scope of the polyolefinic resin (a), along with a combination of the flame retardants, bis(bromophenyl)ethane and antimony trioxide, are comparable to the sample of Reference Example 3 comprising the conventional resin EVA, with respect to their flexibility, and are comparable to the sample of Reference Example 4 comprising the conventional resin EO-0, with respect to their low specific dielectric constant of from 2.7 to 2.9, and that the crosslinked samples of Reference Examples 1 and 2 have high strength to satisfy the requirements as stipulated in the UL Standards in that their initial tensile strength is larger than 1.05 kg/mm$^2$ and their initial elongation is larger than 100%. However, it is known therefrom that, even though the samples of Reference Examples 1 and 2 may have flame resistance to fall within the scope of "self-extinguishable" or "flame-retardant" materials from the data of their oxygen index, they failed to stand the VW-1 perpendicular combustion test.

Next, in order to further improve the flame resistance of the resin composition of Reference Example 1 to such a degree that the composition could stand the VW-1 perpendicular combustion test, still other samples were prepared. Precisely, in Reference Example 1, the amounts of the flame retardants, bis(bromophenyl)ethane and antimony trioxide were increased to prepare a sample of Reference Example 5; and zinc oxide was added to the sample of Reference Example 1 to prepare samples of Reference Examples 6 and 7.

The following are to study various flame retardants.

Reference Example 5:

Herein prepared was a flame-retardant resin composition in the same manner as in Reference Example 1, except that the amount of the flame retardant, bis(bromophenyl)ethane was 80 parts by weight and that the amount of the flame retardant, antimony trioxide was 40 parts by weight.

Reference Example 6:

5 parts by weight of zinc oxide was added to the composition of Reference Example 1.

Reference Example 7:

10 parts by weight of zinc oxide was added to the composition of Reference Example 1.

The samples of those Reference Examples 5 to 7 were subjected to the same tests as above, and the test data obtained are shown in Table 2.

TABLE 2

|  |  | Reference Example 5 | Reference Example 6 | Reference Example 7 |
|---|---|---|---|---|
| Modulus of Tensile Elasticity, kg/cm2 | | 5.2 | 5.1 | 5.1 |
| Oxygen Index | | 32 | 26 | 25 |
| Specific Dielectric Constant, ε | | 3.3 | 2.7 | 2.7 |
| Flame Resistance Test | Longest Burn Time, sec | 28 | shorter than 1 | shorter than 1 |
| | | 9 | 3 | shorter than 1 |
| | | 37 | 7 | shorter than 1 |
| | Total Evaluation | A | A | A |
| Tensile Strength, kg/mm² | | 0.9 | 1.3 | 1.2 |
| Elongation, % | | 440 | 520 | 500 |

As in Table 2 above, the sample of Reference Example 5, in which the amounts of the flame retardants were larger than these in Reference Examples 1 and 2, stood the VW-1 perpendicular combustion test, but its specific dielectric constant increased to 3.3. In addition, the initial tensile strength of the crosslinked sample of Reference Example 5 was lower than 1.05 kg/mm².

As opposed to this, the samples of Reference Examples 6 and 7, in which the amount of bis(bromophenyl)ethane and that of antimony trioxide were the same as those in Reference Example 1 and which additionally contained zinc oxide, were comparable to the sample of Reference Example 1 with respect to their specific dielectric constant, flexibility and strength, and they stood the VW-1 perpendicular combustion test.

Embodiments of Insulated Wires of the Invention:

EXAMPLE 1

100 parts by weight of ethylene-1-octene copolymer (EO-2; this is a commercial product of ENGAGE 8003 having an octene content of 18 mol% and a density of 0.885), which falls within the scope of the polyolefinic resin (a), was mixed with the following components, melted and kneaded in an open roll mixer settled at 120° C. to prepare a flame-retardant resin composition.

| Component | Amount (wt. pts.) |
|---|---|
| Flame Retardants | |
| Bis(bromophenyl)ethane (*1) | 30 |
| Antimony Trioxide | 10 |
| Zinc Oxide | 10 |
| Lubricant | |
| Stearic Acid | 0.5 |
| Antioxidant (*2) | 4 |
| Reinforcing Agent | |
| Silica (*3) | 10 |

(*1) bromine content, 80% by weight; FR-1
(*2) pentaerythritol-tetrakis[3-(3,5-di-t-butyl-4-hydroxyphenyl)propionate]
(*3) mean grain size, 2.5 μm; apparent specific gravity, 50 g/liter Next, using the composition, an insulated wire was prepared in the following manner. The composition was pelletized in a pelletizer and applied onto a conductor, which conductor was prepared by twisting 19 tin-plated soft copper wires each having a diameter of 0.127 mm, and had an outer diameter of about 0.64 mm. The pelletized composition was applied by extrusion at 160° C., using a single-screw extruder (30 mmφ, L/D=24), to form thereon a coating having a thickness of 0.50 mm, which was then exposed to electron beam at an accelerated voltage of 2 MeV to thereby crosslink the coating, the dose of the beam being 200 kGy.

EXAMPLES 2 to 5

Different insulated wires were prepared in the same manner as in Example 1, except that the amounts of the flame retardants, bis(bromophenyl)ethane (FR-1), antimony trioxide and zinc oxide were changed to those shown in Table 3.

The insulated wire samples of those Examples were subjected to the flame resistance test mentioned above, and their specific dielectric constant was measured in the same manner as above. In addition, these samples were subjected to the following tests.

Test for Initial Tensile Strength:

The conductor was drawn out of each insulated wire sample, and the remaining insulating coating was stretched at an elastic stress rate of 500 mm/min, using a tensile tester, to determine its modulus of tensile elasticity (kg/cm²), its breaking tensile strength (kg/mm²) and its breaking elongation (%).

Tensile Test After Heat Aging ((1)temperature rating of 150° C.):

The conductor was drawn out of each insulated wire sample, and the remaining insulating coating was heat-aged at 180° C. for 7 days. Then, the thus heat-aged, insulating coating was stretched at an elastic stress rate of 500 mm/min, using the same tensile tester as above, to determine its breaking tensile strength (kg/mm²) and its breaking elongation (%). The retention of tensile strength (%) and that of elongation (%) of each heat-aged sample were obtained according to the following equations:

Retention of Tensile Strength (%)=[(tensile strength after heat aging)/(initial tensile strength)]×100

Retention of Elongation (%)=[(elongation after heat aging)/(initial elongation)]×100

Test for Extrudability:

Each resin composition sample was applied onto a conductor through extrusion at a speed of 75 m/min or 150 m/min to prepare insulated wires, whereupon the outward appearance of the insulating coating formed was visually checked. The extrudability of each sample was evaluated in accordance with the following criteria:

A: The surface of the insulating coating was smooth with neither haze nor streaks. The extrudability of the sample was excellent.

B: The surface of the insulating coating had some haze and streaks, which, however, were negligible in practical use. The extrudability of the sample was good.

C: The insulating coating had heavy streaks. The extrudability of the sample was bad.

The test data obtained are shown in Table 3.

TABLE 3

| | | Example 1 | Example 2 | Example 3 | Example 4 | Example 5 |
|---|---|---|---|---|---|---|
| EO-2 | | 100 | 100 | 100 | 100 | 100 |
| FR-1 | | 30 | 30 | 40 | 40 | 40 |
| Antimony Trioxide | | 10 | 20 | 15 | 15 | 30 |
| Zinc Oxide | | 10 | 10 | 5 | 10 | 5 |
| Specific Dielectric Constant, $\epsilon$ | | 2.6 | 2.7 | 2.7 | 2.7 | 2.8 |
| Flame Resistance Test | Longest Burn Time, sec | 26 | shorter than 1 | 12 | shorter than 1 | 6 |
| | | 38 | 7 | 9 | 2 | shorter than 1 |
| | | 9 | 47 | shorter than 1 | shorter than 1 | shorter than 1 |
| | Total Evaluation | A | A | A | A | A |
| Initial Data | Tensile Strength, kg/mm$^2$ | 1.4 | 1.3 | 1.2 | 1.2 | 1.2 |
| | Elongation, % | 630 | 570 | 580 | 520 | 560 |
| | Modulus of Tensile Elasticity, kg/cm$^2$ | 8.3 | 8.0 | 8.7 | 9.5 | 8.2 |
| After Heat-aged | Retention of Tensile Strength, % | 98 | 83 | 89 | 86 | 90 |
| | Retention of Elongation, % | 87 | 84 | 81 | 74 | 78 |
| Extrudability | Extrusion speed, 75 m/min | A | A | A | A | A |
| | Extrusion speed, 150 m/min | B | B | B | B | B |

It is apparent from Table 3 above that the insulating coatings of the insulated wire samples of Examples 1 to 5 all satisfy the requirements for the mechanical properties and the flame resistance as stipulated in the UL Standards, while having good flexibility, and a low specific dielectric constant. In addition, it is also apparent from Table 3 that all these samples have good heat-aging resistance, satisfying the requirements for the temperature rating of 150° C. as stipulated in the UL standards.

EXAMPLES 6 to 8

Different insulated wires were prepared in the same manner as in Example 1, except that 100 parts by weight of a resin, EO-1 (trade name ENGAGE 8150, having an octene content of 25 mol % and a density of 0.868), which is the same as that used in Reference Example 1, was used in place of the resin EO-2, that a flame retardant, decabromodiphenyl ether (FR-2, having a bromine content of 82% by weight), bis(bromophenyl)terephthalamide (FR-3, having a bromine content of 61% by weight) or ethylenebis-bromophthalimide (FR-4, Saytex BT93, trade name of Ethyl Co.) was used in place of the flame retardant bis(bromophenyl)ethane (FR-1), and that the amounts of the bromine-containing flame retardant, antimony trioxide and zinc oxide were changed to those shown in Table 4.

EXAMPLE 9

An insulated wire was prepared in the same manner as in Example 1, except that a resin mixture of 60 parts by weight of EO-1 and 40 parts by weight of EEA (having an ethyl acrylate content of 25% by weight and a melt flow index of 0.5) was used, and that the amounts of the flame retardants, bis(bromophenyl)ethane (FR-1), antimony trioxide and zinc oxide were changed to those shown in Table 4.

EXAMPLE 10

An insulated wire was prepared in the same manner as in Example 1, except that a resin mixture of 70 parts by weight of EO-1 and 30 parts by weight of EVA (having a vinyl acetate content of 33% by weight and a melt flow index of 1) was used, and that the amounts of the flame retardants, decabromodiphenyl ether (FR-2), antimony trioxide and zinc oxide were changed to those shown in Table 4.

COMPARATIVE EXAMPLES 1 to 5

Different insulated wires were prepared in the same manner as in Examples 6 to 10, except that zinc oxide was not added.

The insulated wire samples in those Examples and Comparative Examples were subjected to the same tests as above to determine their flame resistance, specific dielectric constant, initial tensile strength, heat-aged tensile strength and extrudability.

The test data of the samples of Examples are shown in Table 4, and those of Comparative Examples are in Table 5.

TABLE 4

|  |  | Example 6 | Example 7 | Example 8 | Example 9 | Example 10 |
|---|---|---|---|---|---|---|
| EO-1 | | 100 | 100 | 100 | 60 | 70 |
| EEA | | — | — | — | 40 | — |
| EVA | | — | — | — | — | 30 |
| FR-1 | | — | — | — | 40 | — |
| FR-2 | | 40 | — | — | — | 40 |
| FR-3 | | — | 50 | — | — | — |
| FR-4 | | — | — | 40 | — | — |
| Antimony Trioxide | | 20 | 30 | 20 | 20 | 30 |
| Zinc Oxide | | 10 | 10 | 5 | 10 | 15 |
| Specific Dielectric Constant, $\epsilon$ | | 2.7 | 2.8 | 2.7 | 3.2 | 3.2 |
| Flame Resistance Test | Longest Burn Time, sec | 2 | shorter than 1 | 6 | shorter than 1 | 5 |
| | | Shorter than 1 | shorter than 1 | 5 | shorter than 1 | 7 |
| | | Shorter than 1 | 4 | 2 | shorter than 1 | shorter than 1 |
| | Total Evaluation | A | A | A | A | A |
| Initial Data | Tensile Strength, kg/mm$^2$ | 1.4 | 1.3 | 1.3 | 1.4 | 1.3 |
| | Elongation, % | 630 | 570 | 580 | 420 | 470 |
| | Modulus of Tensile Elasticity, kg/cm$^2$ | 5.5 | 4.8 | 4.7 | 7.6 | 5.1 |
| After Heat-aged | Retention of Tensile Strength, % | 86 | 80 | 90 | 99 | 95 |
| | Retention of Elongation, % | 78 | 88 | 74 | 84 | 72 |
| Extrudability | Extrusion speed, 75 m/min | A | A | A | A | A |
| | Extrusion speed, 150 m/min | B | B | B | A | A |

TABLE 5

|  |  | Comparative Example 1 | Comparative Example 2 | Comparative Example 3 | Comparative Example 4 | Comparative Example 5 |
|---|---|---|---|---|---|---|
| EO-1 | | 100 | 100 | 100 | 60 | 70 |
| EEA | | — | — | — | 40 | — |
| EVA | | — | — | — | — | 30 |
| FR-1 | | — | — | — | 40 | — |
| FR-2 | | 40 | — | — | — | 40 |
| FR-3 | | — | 50 | — | — | — |
| FR-4 | | — | — | 40 | — | — |
| Antimony Trioxide | | 20 | 30 | 20 | 20 | 30 |
| Zinc Oxide | | — | — | — | — | — |
| Specific Dielectric Constant, $\epsilon$ | | 2.7 | 2.8 | 2.7 | 3.2 | 3.1 |
| Flame Resistance Test | Longest Burn Time, sec | longer than 60 | longer than 60 | 42 | 28 | longer than 60 |
| | | longer than 60 | longer than 60 | 55 | longer than 60 | longer than 60 |
| | | 47 | longer than 60 | longer than 60 | 55 | longer than 60 |
| | Total Evaluation | C | C | C | C | C |
| Initial Data | Tensile Strength, kg/mm$^2$ | 1.3 | 1.3 | 1.2 | 1.3 | 1.4 |
| | Elongation, % | 570 | 580 | 600 | 450 | 520 |
| | Modulus of Tensile Elasticity, kg/cm$^2$ | 5.5 | 5.0 | 4.7 | 7.2 | 4.9 |
| After Heat-aged | Retention of Tensile Strength, % | 94 | 82 | 82 | 86 | 87 |
| | Retention of Elongation, % | 88 | 71 | 84 | 92 | 75 |

TABLE 5-continued

|  |  | Comparative Example 1 | Comparative Example 2 | Comparative Example 3 | Comparative Example 4 | Comparative Example 5 |
|---|---|---|---|---|---|---|
| Extrudability | Extrusion speed, 75 m/min | A | A | A | A | A |
|  | Extrusion speed, 150 m/min | B | B | B | A | A |

From the results shown in Table 4 and Table 5 above demonstrate that the insulating coatings of the insulated wire samples of Examples 6 to 10, to which was added the flame retardant, zinc oxide, were all superior to those of the insulated wire samples of Comparative Examples 1 to 5, to which was not added the flame retardant, zinc oxide, in that the former satisfy all the requirements for the mechanical properties and the heat-aging resistance at the temperature rating of 150° C. as stipulated in the UL Standards and satisfy all the requirements for the flame resistance as stipulated in the UL Standards, while having good flexibility and a low specific dielectric constant. The properties of the samples of Examples 6 to 8, in which the polyolefinic resin (a) and the bromine-containing flame retardant are different from those in Examples 1 to 5, are comparable to those of the samples of Examples 1 to 5. In addition, the samples of Examples 9 and 10, which comprise a combination of the polyolefinic resin (a), EO-1, and the conventional resin, EEA or EVA, have better extrudability than the other samples. The improvement in the extrudability of those samples of Examples 9 and 10 resulted from the combination of the two resins.

EXAMPLE 11

An insulated wire was prepared in the same manner as in Example 1, except that 100 parts by weight of the resin EO-1 (trade name ENGAGE 8150, having an octene content of 25 mol % and a density of 0.868) was used in place of the resin EO-2, and that a chlorine-containing flame retardant, perchloropentacyclodecane (FR-5, Dechloranplus, trade name of Hooker Chemicals and Plastics Corp.) was used in place of the flame retardant bis(bromophenyl)ethane (FR-1). The amounts of FR-5, antimony trioxide and zinc oxide used herein are shown in Table 6.

COMPARATIVE EXAMPLE 6

An insulated wire was prepared in the same manner as in Example 11, except that zinc oxide was not added.

EXAMPLE 12

Using the composition of Example 4, an insulated wire was prepared in the following manner. The composition was pelletized, using a pelletizer, and applied onto a conductor (this was prepared by twisting 7 tin-plated soft copper wires each having a diameter of 0.27 mm, and had an outer diameter of about 0.81 mm) through extrusion at 160° C., using a single-screw extruder (30 mm$\phi$, L/D=24), to form thereon a coating having a thickness of 0.80 mm, which was then exposed to electron beam at an accelerated voltage of 2 MeV to thereby crosslink the coating, the dose of the rays being 250 kGy.

COMPARATIVE EXAMPLE 7

An insulated wire was prepared in the same manner as in Example 12, except that zinc oxide was not added.

The insulated wire samples in those Examples and Comparative Examples were subjected to the same tests as above to determine their flame resistance, specific dielectric constant, initial tensile strength and heat-aged tensile strength (in the heat-aging test (1)). In addition, the sample of Example 11 was subjected to the following heat-aging test (2).

Tensile Test After Heat Aging ((2)temperature rating of 125° C.):

The conductor was drawn out of the insulated wire sample of Example 11, and the remaining insulating coating was heat-aged at 158° C. for 7 days. Then, the thus heat-aged, insulating coating was stretched at an elastic stress rate of 500 mm/min, using the same tensile tester as above, to determine its breaking tensile strength (kg/mm$^2$) and its breaking elongation (%), in the same manner as in the heat-aging test (1). The retention of tensile strength (%) and that of elongation (%) of the heat-aged sample were obtained according to the equations mentioned above.

The test data obtained are shown in Table 6.

TABLE 6

|  | Example 11 | Comparative Example 6 | Example 12 | Comparative Example 7 |
|---|---|---|---|---|
| EO-1 | 100 | 100 | — | — |
| EO-2 | — | — | 100 | 100 |
| FR-1 | — | — | 40 | 40 |
| FR-5 | 50 | 50 | — | — |
| Antimony Trioxide | 30 | 30 | 15 | 15 |
| Zinc Oxide | 15 | — | 10 | — |
| Specific Dielectric Constant, $\epsilon$ | 2.9 | 2.8 | 2.7 | 2.7 |

TABLE 6-continued

|  |  | Example 11 | Comparative Example 6 | Example 12 | Comparative Example 7 |
|---|---|---|---|---|---|
| Flame Resistance Test | Longest Burn Time, sec | 12<br>26<br>5 | 53<br>longer than 60<br>longer than 60 | shorter than 1<br>12<br>18 | longer than 60<br>55<br>longer than 60 |
|  | Total Evaluation | A | B | A | B |
| Initial Data | Tensile Strength, kg/mm$^2$ | 1.1 | 1.1 | 1.3 | 1.4 |
|  | Elongation, % | 360 | 380 | 460 | 480 |
|  | Modulus of Tensile Elasticity, kg/cm$^2$ | 5.8 | 5.2 | — | — |
| After Heat-aged in (1) | Retention of Tensile Strength, % | 73 | 68 | 87 | 91 |
|  | Retention of Elongation, % | 36 | 41 | 82 | 88 |
| After Heat-aged in (2) | Retention of Tensile Strength, % | 92 | — | — | — |
|  | Retention of Elongation, % | 79 | — | — | — |

Based upon the data of the samples of Example 11 and Comparative Example 6 which contained the chlorine-containing flame retardant in place of the bromine-containing flame retardant in the other samples, it is apparent that the insulating coating of the sample of Example 11 containing zinc oxide is superior to that of the sample of Comparative Example 6 not containing zinc oxide, in that the former satisfies all the requirements for the mechanical properties and the flame resistance as stipulated in the UL Standards, while having good flexibility and a low specific dielectric constant. The insulating coating of the sample of Example 11, containing the chlorine-containing flame retardant in place of the bromine-containing flame retardant in the other samples, could not satisfy the requirements for the heat-aging resistance at the temperature rating of 150° C. as stipulated in the UL Standards, but satisfied the requirements for the heat-aging resistance at the temperature rating of 125° C. in the UL Standards.

The data of the samples of Example 12 and Comparative Example 7, of which the size of the conductor and the thickness of the insulating film were different from those of the other samples and for which the crosslinking condition was different from that for the other samples, show that the insulating coating of the sample of Example 12 containing zinc oxide is superior to that of the sample of Comparative Example 7 not containing zinc oxide, in that the former satisfies all the requirements for the mechanical properties and the heat-aging resistance at the temperature rating of 150° C. as stipulated in the UL Standards and satisfies all the requirements for the flame resistance as stipulated in the UL Standards, while having a low specific dielectric constant.

Embodiments of Shielded Wires of the Invention:

EXAMPLE 13

Using the flame-retardant resin composition of Example 1, herein prepared was a shielded wire in the manner mentioned below. The composition was pelletized, using a pelletizer, and applied onto a conductor, which conductor was prepared by twisting 7 tin-plated soft copper wires each having a diameter of 0.17 mm, and had an outer diameter of about 0.51 mm. The pelletized composition was applied by extrusion at 160° C., using a single-screw extruder (30 mm$\phi$, L/D=24), to form thereon a coating having a thickness of 0.40 mm, which was then exposed to electron beam at an accelerated voltage of 2 MeV to thereby crosslink the coating, the dose of the beam being 150 kGy. Thus was formed an insulating coating to cover the conductor.

Next, a tin-plated soft copper wire having an outer diameter of 0.127 mm was spirally wound around the insulating coating to form thereon an outer conductor layer, onto which were applied pellets of a soft polyvinylchloride resin composition (Sumicon$^R$ VM-M034F, trade name of Sumitomo Bakelite Co.) through extrusion using a single-screw extruder (40 mm$\phi$, L/D=24) to form thereon a coating having a thickness of 0.20 mm. This was then exposed to electron beam at an accelerated voltage of 2 MeV to thereby crosslink the coating, the dose of the beam being 100 kGy. Thus was formed a sheath layer to cover the outer conductor layer.

EXAMPLE 14

In the same manner as in Example 13, an insulating coating and an outer conductor layer were laminated over a core conductor. Next, the flame-retardant resin composition of Example 10 was pelletized, using a pelletizer, and applied onto the core conductor that had been coated with the insulating coating and the outer conductor layer in that order, by extrusion using a single-screw extruder (40 mm$\phi$, L/D=24) to form thereon a coating having a thickness of 0.20 mm. This was then exposed to electron beam at an accelerated voltage of 2 MeV to thereby crosslink the coating, the dose of the beam being 150 kGy. Thus was formed a sheath layer to cover the outer conductor layer. In that manner was prepared herein a shielded wire.

EXAMPLE 15

1.5 parts by weight of a chemical foaming agent, azobiscarbonamide (Vinihole AC3M, trade name of Eiwa Chemical Industry Co.) was added to the flame-retardant resin composition of Example 2, and the resulting mixture was pelletized using a pelletizer. Then, those pellets were applied onto a conductor (this was prepared by twisting 7 tin-plated soft copper wires each having a diameter of 0.17 mm, and had an outer diameter of about 0.51 mm) through foaming extrusion at 140° C., using a single-screw extruder (30 mmφ, L/D=24), to form thereon a coating having a thickness of 0.40 mm and a capacitance of 100 pF+/−5 pF, which was then exposed to electron beam at an accelerated voltage of the insulating coating but not with the outer conductor layer and the sheath layer. In the initial tensile test and the heat-aged tensile test (1), tested were the insulating coating and the sheath layer of each sample.

The test data obtained are shown in Table 7.

TABLE 7

|  |  | Example 13 | Example 14 | Example 15 | Comparative Example 8 |
|---|---|---|---|---|---|
| Capacitance, pF/m |  | 157 | 158 | 96 | 196 |
| Flame Resistance Test | Longest Burn Time for Complete Shielded Wire, sec | shorter than 1 | 4 | shorter than 1 | shorter than 1 |
|  |  | shorter than 1 | 15 | shorter than 1 | shorter than 1 |
|  |  | shorter than 1 | 7 | shorter than 1 | shorter than 1 |
|  | Total Evaluation | A | A | A | A |
| Flame Resistance Test | Longest Burn Time for Insulating Coating, sec | 2 | — | shorter than 1 | shorter than 1 |
|  |  | shorter than 1 | — | shorter than 1 | 5 |
|  |  | 6 |  | shorter than 1 | 2 |
|  | Total Evaluation | A | — | A | A |
| Initial Data of Insulating Coating | Tensile Strength, kg/mm$^2$ | 1.3 | 1.2 | — | — |
|  | Elongation, % | 620 | 540 | — | — |
| Heat-aged Insulating Coating | Retention of Tensile Strength, % | 84 | 87 | — | — |
|  | Retention of Elongation, % | 85 | 82 | — | — |
| Initial Data of Sheath Layer | Tensile Strength, kg/mm$^2$ | 2.6 | 1.5 | — | — |
|  | Elongation, % | 360 | 480 | — | — |
| Heat-aged Sheath Layer | Retention of Tensile Strength, % | Could not measure | 84 | — | — |
|  | Retention of Elongation, % | Could not measure | 73 | — | — |

2 MeV to thereby crosslink the coating, the dose of the beam being 150 kGy. Thus was formed an insulating coating to cover the conductor.

Next, an outer conductor layer and a soft polyvinyl chloride resin sheath layer were formed over the insulating coating in that order, in the same manner as in Example 13. In that manner was prepared herein a shielded wire.

COMPARATIVE EXAMPLE 8

A shielded wire was prepared in the same manner as in Example 13, except that the resin composition of Reference Example 3 was used to form the insulating coating.

The samples of those Examples and Comparative Example were subjected to the same flame resistance tests as above and to the following tests.

Measurement of Capacitance:

Each sample was cut into test cords each having a length of 3 m, for which was measured the capacitance (pF/m) between the core conductor and the outer conductor. Three test cords of each sample were measured, and the data obtained were averaged.

In addition, the samples of Examples 13 and 14 were subjected to the initial tensile test and the heat-aged tensile test(1) in the same manner as above.

In the flame resistance tests, tested were the complete shielded wire samples, and the samples covered with only The data in Table 7 above demonstrate that the insulating coating in any of the shielded wire samples of Examples 13 to 15 has a smaller capacitance than that in the sample of Comparative Example 8. Studying the samples of those Examples in detail, it is apparent that the capacitance of the foamed insulating coating in the sample of Example 15 is smaller than that of the non-foamed insulating coating in the samples of Examples 13 and 14.

Comparing the samples of Examples 13 and 14, it is apparent that the sample of Example 14 in which not only the insulating coating but also the sheath layer was made from the flame-retardant resin composition of the invention is superior to that of Example 13 in which the sheath layer was made from the conventional soft polyvinyl chloride resin in that the heat-aging resistance of the sheath layer of the former is far superior to that of the sheath layer of the latter.

Embodiments of Insulating Tubes of the Invention:

EXAMPLE 16

The flame-retardant resin composition of Example 8 was pelletized, using a pelletizer, and formed into a tube having an inner diameter of 1.5 mm and an outer diameter of 3.0 mm by extrusion at 150° C., using a single-screw extruder (30 mmφ, L/D=24), which was then exposed to electron beam at an accelerated voltage of 2 MeV to thereby crosslink it, the dose of the beam being 150 kGy. Thus was prepared an insulating tube.

The insulating tube sample thus prepared herein was subjected to the initial tensile test in the same manner as above, which verified that the initial tensile strength of the sample is 1.5 kg/mm² and the initial elongation thereof is 550%. Thus, the sample satisfies the requirements for mechanical properties as stipulated in the UL Standards. The modulus of tensile elasticity of the sample was found to be 6.8 kg/cm², which verifies the high flexibility of the sample.

EXAMPLE 17

The insulating tube prepared in Example 16 was cut into test samples each having a length of 3 m. One end of each tube sample was sealed, while the other end thereof was connected with a nitrogen cylinder. A part of this tube sample having a length of about 1 m from its sealed end was inserted into an aluminum pipe having an inner diameter of 6.0 mmϕ that had been set in a Geer oven at 150° C.

In that condition, the tube sample was pre-heated for 3 minutes, and thereafter nitrogen gas was gradually introduced thereinto through the nitrogen cylinder to thereby increase the inner pressure in the tube sample, whereby the tube sample was expanded in the radial direction and airtightly attached to the inner surface of the aluminum pipe. With that condition being kept as such, the tube sample was taken out of the Geer oven along with the aluminum pipe, and put into a water tank filled with water to cool it. Thus was prepared an insulating tube sample with thermal shrinkability.

A round rod of iron having an outer diameter of 2.0 mmϕ was covered with this shrinkable, insulating tube sample, then left in a Geer oven at 150° C. for 3 minutes, and thereafter taken out of the oven. As a result, it was confirmed that the tube shrunk under heat to airtightly adhere to the outer surface of the rod.

Next, an electroconductive coating material was applied onto the outer surface of the insulating tube that had thermally shrunk to airtightly adhere to the outer surface of the rod, and the capacitance (1 MHz) between the electroconductive coating thus formed on the tube and the core rod was measured to be about 280 pF/m, which corresponds to 2.67 in terms of the specific dielectric constant of the tube. Thus, it was found that the specific dielectric constant of the tube is low.

On the other hand, the insulating tube that had thermally shrunk to airtightly adhere to the outer surface of the rod was subjected to the flame resistance test in the same manner as above, in which three samples of the tube were tested. As a result, the longest burn time of every sample was within 60 seconds, from which it is understood that the tube has high flame resistance that satisfies the requirements as stipulated in the UL Standards.

As has been described in detail hereinabove, the present invention provides a flame-retardant resin composition, which, after having been crosslinked, can be formed into insulating coatings, sheath layers and insulating tubes having good mechanical properties that satisfy the requirements as stipulated in the UL Standards and having good flame resistance, high flexibility and a low specific dielectric constant. The invention therefore provides insulated wires, shielded wires and insulating tubes which are produced by the use of the resin composition. Accordingly, the specific advantages of the invention are that the resin composition is favorably and safely used in the technical field requiring high-frequency current transmission, for example, in the field of high-density wiring of internal circuits in electronic appliances, such as back light units in liquid crystal display devices.

While the invention has been described in detail and with reference to specific embodiments thereof, it will be apparent to one skilled in the art that various changes and modifications can be made therein without departing from the spirit and scope thereof.

What is claimed is:

1. An insulating tube as produced by shaping into a tube then cross-linking it with a flame retardant resin composition comprising:
    (a) a thermoplastic polyolefinic resin having a density of smaller than 0.89g/cm³, prepared by copolymerizing ethylene and non-polar α-olefin in the presence of a single-site metallocene catalyst;
    (b) a halogen-containing flame retardant; and
    (c) zinc oxide;
    wherein the cross-linked flame-retardant resin composition has an initial tensile strength of n less than 1.05 kg/mm² and an initial elongation of not less than 100%, as stipulated in the UL Standards; and wherein the resin composition has a flame resistance that satisfies all the following three requirements in the VW-1 perpendicular combustion test:
        1) the longest burn time for the sample is within 60 seconds;
        2) the kraft paper attached to the upper side of the sample is not burnt; and
        3) the absorbent cotton disposed below the sample is not burnt by the burnt droppings of the sample;
    wherein the resin composition has modules of tensile elasticity of not larger than 10kg/cm² and has a specific dielectric constant less than 3.3, and
    wherein the resin composition comprises about 20 to about 60 parts by weight of halogen-containing flame-retardant and about 5 to about 20 parts by weight of zinc oxide, based upon 100 parts by weight of the thermoplastic polyolefinic resin.

2. An insulating tube of claim 1, wherein it is expanded under heat in the radial direction and then cooled in the expanded condition to thereby cause the tube to have thermal shrinkability.

* * * * *